March 24, 1931.　　　　C. W. TODD　　　　1,797,301
AXLE JOURNAL BEARING
Filed March 28, 1928　　2 Sheets-Sheet 1
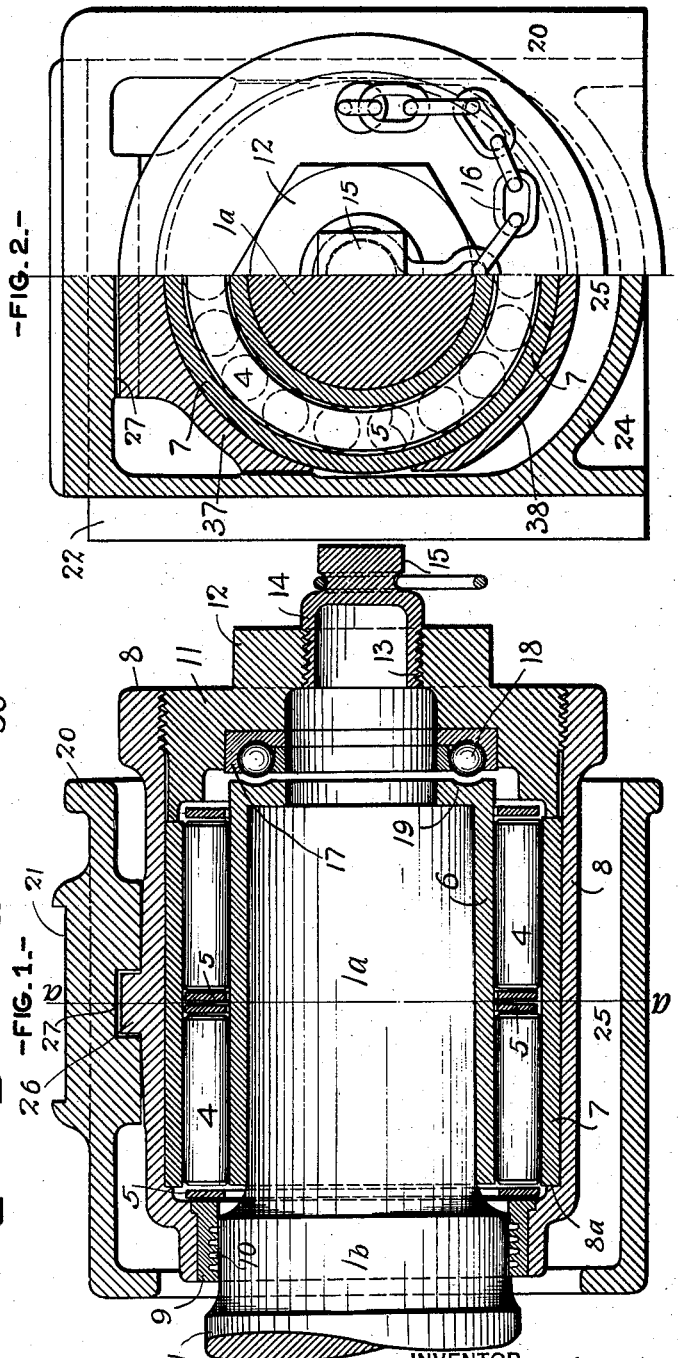
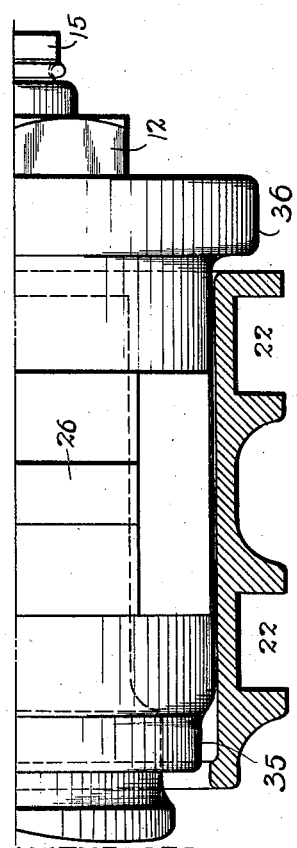
WITNESSES　　　　INVENTOR March 24, 1931.　　　C. W. TODD　　　1,797,301
AXLE JOURNAL BEARING
Filed March 28, 1928　　　2 Sheets-Sheet 2
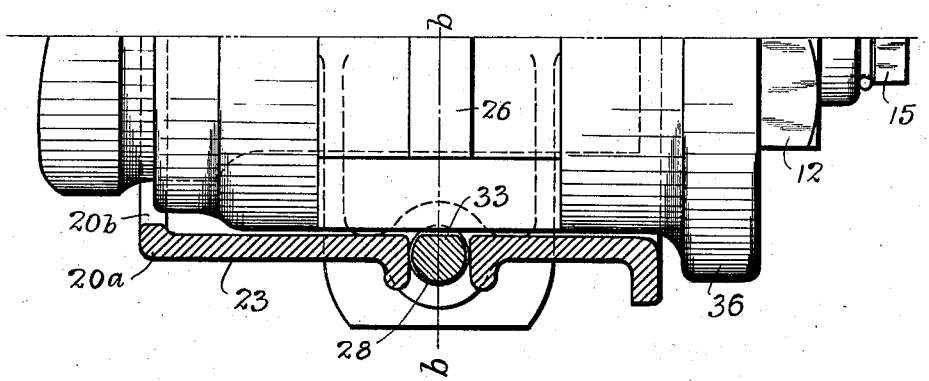
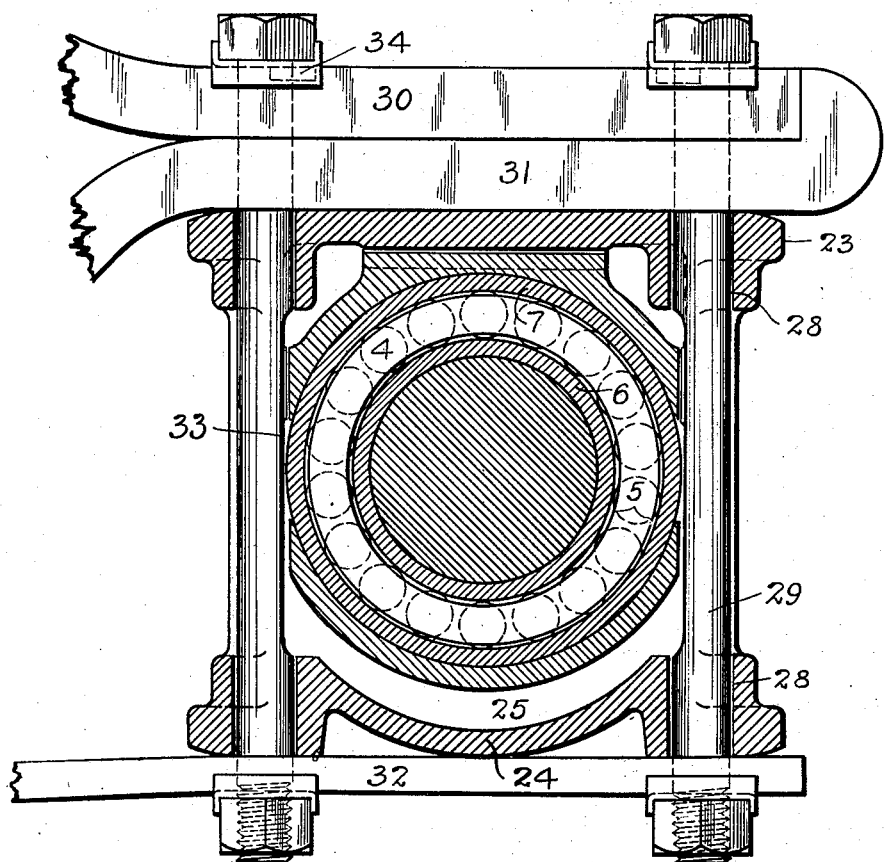

UNITED STATES PATENT OFFICE

CHARLES W. TODD, OF SCHENECTADY, NEW YORK

AXLE-JOURNAL BEARING

Application filed March 28, 1928. Serial No. 265,386.

This invention relates generally to the class or type of appliances known as bearings for collarless axle journals, and its object is to provide a structure of such type, embodying an outer housing, and an anti-friction bearing mechanism retained within the housing, adapted for easy longitudinal removal from, and replacement upon, the journal, to permit inspection and change of parts when found necessary.

The improvement claimed is hereinafter fully set forth.

In the accompanying drawings: Figure 1, is a vertical longitudinal central section, of a bearing, illustrating an embodiment of the invention, the journal being shown in elevation; Fig. 2, a view, half in front elevation, and half in vertical transverse section, on the line *a a*, of Fig. 1; Fig. 3, a half plan view, partly in section; Fig. 4, a half plan view, partly in section, showing a structural modification, and; Fig. 5, a vertical transverse section, on the line *b b* of Fig. 4, with certain parts added.

In the practice of the invention, referring descriptively to the specific embodiment thereof, which is herein exemplified, one of the end portions only of the axle, 1, is shown, it being understood that the axle is provided with a collarless journal, 1*a*, at each of its ends, a short intermediate section 1*b*, of greater diameter than the journal, being interposed between each journal and the body of the axle.

While the invention is designed for general application, in connection with axle having collarless journals formed at their ends, it is to be noted, at the outset, that there may be modifications of certain details in various instances, as for example,—due consideration must be given to the design of the outer housing, depending upon whether the invention is to be employed in connection with a locomotive, or a passenger or freight car, or other vehicle. Furthermore, where the invention is to be employed on standard equipment, or old equipment for replacement, not only will the outer housing be suitably designed, but the anti-friction bearing mechanism may also be likewise suitably designed, to accommodate it for use in such equipment. It is also contemplated, to employ the invention in connection with the housings now in use, with suitable modifications thereof, and appropriate designing of the anti-friction mechanism, to accommodate it to such use. Furthermore, the outer housing, in any instance, may be of the detachable type, or may be formed integral with the truck. Such contemplated modifications as may be found necessary, will be in minor details, well within the province of the mechanical skill of those versed in the art.

In the present instance, for the purpose of illustration, two embodiments are shown in the accompanying drawings, the journal box or outer housing being specially designed in each instance for old equipment. In Figs. 1, 2, and 3, the outer housing is shown as designed for use with a standard pedestal truck, used on passenger cars, while in Figs. 4 and 5, it is shown as designed for use on standard arch bar trucks used on freight cars.

The essential feature of the invention is the provision of anti-friction bearing mechanism that may be easily removed, for inspection, replacement, or repair of the parts while in road service, without the necessity of shop facilities.

The journal box or outer housing, which is secured to, or made integral with, the truck, is a load supporting member thereof, and is designed to bear on the anti-friction mechanism. In the present embodiment of the invention, the easy removal, or replacement of the anti-friction mechanism, is accomplished, by providing the axle with collarless journals, which offer no obstruction to the longitudinal movement of the anti-friction mechanism over them; and the anti-friction mechanism and outer housing are so constructed, as to permit a relative vertical movement, whereby the outer housing may be jacked up, and thus moved out of operable position, relative to the anti-friction bearing, which latter may then be moved longitudinally as desired. In the present instance, the easy removal of the anti-friction mechanism, is accomplished by providing an outer housing with an extended lower portion, which presents a clearance space, between the anti-friction mechanism and the outer housing, such space permitting the desired relative vertical movement to take place. The invention is, in no sense, limited to any particular type of anti-friction means, and in the present instance, a well known type is employed, with certain modifications which will be hereinafter noted.

The journal, 1a, is, as heretofore, stated, reduced in diameter, relatively to the body of the axle and a short interposed section, 1b, is also slightly reduced. The anti-friction bearing proper, comprises two sets of cylindrical roller bearings, 4, rotatably mounted in retaining rings, 5. These bearings are mounted upon a bushing, 6, tightly fitting the journal, 1a, and within a second bushing, 7, tightly fitting an inner housing, 8, and abutting a shoulder, 8a, formed in the inner housing. These bushings are usually employed to give the proper wear surfaces, and may be secured in place, by a tight fit, or otherwise as desired. The inner end of the inner housing is provided with a bushing, 9, which has packing material, 10, fitting in grooves, for making a leak tight seal with the reduced portion, 1b, of the axle, to prevent the lubricant from escaping at this connection, and to prevent foreign matter entering the anti-friction bearing. The opposite end of the inner housing, 8, is interiorly threaded to receive the exteriorly threaded closure, 11, which is provided with a head, 12, for the reception of a wrench. The closure is formed with a central orifice, 13, interiorly threaded to receive the exteriorly threaded plug, 14, having a head, 15, for the reception of a wrench. The plug provides a ready means for filling the bearing with grease for lubricating the parts. A chain, 16, is secured to the plug and to the closure, as clearly shown in Fig. 2, to prevent the plug from being mislaid or lost when removed. The closure is chambered to receive the sectional race ways, 17, which may be spot welded, or otherwise secured, to the closure. The race way is filled with ball bearings, 18, which bear against a disc, 19, shown hollow, and integrally formed with the bushing, 6, to take the end thrust, in a manner later to be described. The parts are so proportioned, that the inner end of the closure, 11, abuts the outer end of the bushing, 7, thereby properly positioning the end thrust bearing.

The rings, 5, are a loose fit over the bearing, 6, and the interior diameter of the bushing, 9, is made slightly greater than the exterior diameter of the bushing, 6. It will thus be seen that the journal offers no obstruction, and that the entire anti-friction bearing mechanism is free to be moved longitudinally on the journal, or more strictly, longitudinally on the bushing, 6, whereby it may be inserted upon, and removed from, the journal, as desired.

In Figs. 1, 2, and 3, an outer housing, 20, is shown, for retaining the inner housing and its contained parts. The outer housing here shown is provided with channels, 21, 22, 22, for securing it to the standard type of pedestal trucks for passenger cars, in the usual and well known manner. Figs. 4 and 5, show a different type of outer housing, 23, designed for the standard arch bar type of truck used on freight cars. The load (or part of the load) of the truck, is supported by the outer housing. The outer housing is open at its outer end, for the reception, or removal, of the inner housing, and is but partly closed at its inner end, 20a, thereby providing an opening, 20b, for the reception of the journal. The outer housing bears upon the top of the inner housing, when in operable position, and must be raised, to permit of the removal or insertion, of the anti-friction bearing mechanism. To permit this relative vertical movement, a lower extended portion, 24, is formed on the outer housing, providing a clearance space, 25, at the bottom, between the two housings, which space, as is obvious, allows the outer housing to be moved upwardly the distance of the clearance space. The sides of the outer housing are made rectangular, and the sides of the inner housing, are squared to fit within the side walls of the outer housing, thereby preventing rotation or lateral movement, of the inner housing.

As before stated, it is necessary that the anti-friction bearing mechanism be held against accidental longitudinal movement, and in the present instance, this is accomplished by tongue and groove, cooperating members, a tongue, 26, being formed on the top of the inner housing, transversely thereof; and a groove, 27, being formed in the interior, of the top wall, of the outer housing transversely thereof. Therefore, to move the outer housing to inoperable position, it is necessary to raise it a sufficient amount to clear these cooperating members and the clearance space, 25, is made of sufficient size to permit this.

In order that the end ball bearings, 18, may operate to take up the end thrust of the journal, 1a, it is essential that the thrust bearing in the closure, 11, be secured, relatively to the outer housing, 20, or the truck to which it is secured, or made a part of, (not shown in Figs. 1, 2, and 3). The tongue and groove connection between the two housings just described, therefore serves the double purpose of preventing accidental displacement of the inner housing and its contained parts, and of cooperating with the thrust bearing, to permit the latter to receive the thrust from the journal.

The outer housing, 23, differs from the housing, 20, mainly, in the usual way, that the two corresponding standard housings differ to adapt them for their respective uses.

The housing, 23, accordingly, is provided with the holes, 28, for connecting it to the bolts, 29, that are secured in orifices in the top arch bar, 30, bottom arch bar, 31, and binder, 32, which form parts of the usual truck mechanism.

The old standard equipment is, usually, not suitably designed for anti-friction bearing mechanism, and the housing space allowable is, therefore, accordingly limited. The present invention contemplates the use thereof, in an entirely new equipment, which may obviously be designed to accommodate it, and also old equipment, as already stated, by the replacement of the old journal box or housing, by one suitably constructed for the present invention, or even by changing the old journal box or housing in a suitable manner to accommodate it to the present invention. Such adaptations of the invention are contemplated as where the journal box is formed integral with the truck frame and likewise in instances where it is detachable therefrom.

Figs. 1, 2, and 3, show a construction especially adapted for interchange with the journal box, or housing, of the standard pedestal type of truck, and Figs. 4 and 5, show a construction especially adapted, for interchange with the journal box, or housing, of the standard arch bar type of truck. In both instances, the outer housing is given as great a width as the standard equipment with which it is to be used will permit, in order to accommodate the anti-friction mechanism, which, on the other hand, is given the least possible width, consistent with good practice, in order to permit it to fit within the outer housing. The anti-friction mechanism, in the several views of the drawings, is given a width equal to the diameter of the outer bushing, 7, and to provide for this width, the bolts, 29, in Figs. 4, and 5, are cut away on their inner sides, as indicated at 33, and dowel pins, 34, are employed to prevent the bolts from turning. Furthermore, the inner housing, in the two embodiments shown, is accordingly, constructed with the inner open end, 35, reduced in diameter, and made continuous, and the outer end is provided with an extension, 36, that projects beyond the outer housing, which is likewise made continuous. The inner housing is of skeleton formation, comprising an upper rib, 37, and a lower rib, 38, with intervening spaces, the ribs being connected to the two end portions, 35, and 36, by forming them integrally therewith. Retaining walls are thus provided for the bushing, 7, which extend sufficiently on each side, to give ample support for the bushing, without increasing the width of the inner housing.

While, in the embodiments illustrated, the outer housing is shown as comprising a lower enclosing wall providing the space, 25, it will be understood that, in some cases it may be desired to dispense with this lower wall of the outer housing, which modification will provide a construction enabling the desired relative vertical movement of the two housings, to facilitate the removal or insertion of the inner housing.

It will be seen from the foregoing, that when inspection, repair, or replacement, of any of the parts is desired, all that is necessary is to jack up the outer housing until the coacting groove, 27, is moved out of operable position, whereupon the inner housing, with its retaining parts, may be easily moved longitudinally over the journal, for replacement upon, or removal from, the journal as desired.

The invention claimed and desired to be secured by Letters Patent is:

1. The combination of an anti-friction bearing for a collarless journal axle, adapted to be moved longitudinally over a journal thereof, for insertion upon, and removal from, the journal, and provided with an outer supporting surface upon its upper wall; a housing for the bearing supported on said surface; and coacting elements for detachably securing the bearing against longitudinal movement disposed between the ends thereof.

2. The combination of an anti-friction bearing for a collarless journal axle, adapted to be moved longitudinally over a journal thereof, for insertion upon, and removal from, the journal; a housing for the bearing, having its lower portion extended to provide a lower space between the housing and the bearing, permitting the housing to be raised, preliminary to removal, or insertion, of the bearing; and horizontally spaced coacting elements for detachably securing the bearing against longitudinal movement disposed between the ends of the bearing and housing.

3. The combination of an anti-friction bearing for a collarless journal axle; an inner housing for the bearing, adapted to be moved longitudinally over a journal of the axle, for insertion and removal of said bearing, upon, and from, the journal, respectively; an outer housing for the inner housing, having its lower portion extended to provide a lower space between the housings, permitting the outer housing to be raised preliminary to removal, or insertion, of the bearing; and horizontally spaced coacting elements for detachably securing the inner housing against longitudinal movement disposed between the ends of the two housings.

4. The combination of an anti-friction bearing for a collarless journal axle; an inner housing for the bearing, adapted to be moved longitudinally over a journal of the axle, for insertion and removal, of said bearing upon, and from, the journal, respectively; an outer housing for the inner housing, having a lower portion extended to provide a lower space between the housings, permitting the outer housing to be raised, preliminary to removal or insertion, of the bearing; and horizontally spaced cooperating members on the housings, for detachably securing the inner housing against longitudinal movement, said cooperating member in the outer housing being moved to inoperable position by sufficient raising of the outer housing.

5. The combination of an anti-friction bearing for a collarless journal axle; an inner housing for the bearing, adapted to be moved longitudinally over a journal of the axle, for insertion and removal of said bearing upon, and from, the journal, respectively; an outer housing for the inner housing; and horizontally spaced coacting elements for detachably securing the inner housing against longitudinal movement disposed between the ends of the two housings.

6. The combination of an anti-friction bearing for a collarless journal axle; an inner housing for the bearing, adapted to be moved longitudinally over a journal of the axle, for insertion and removal of said bearing upon, and from, the journal, respectively; an outer housing for the inner housing; and horizontally spaced coacting elements for detachably securing the inner housing to the outer housing, to prevent longitudinal movement of the inner housing.

7. The combination of an anti-friction bearing for a collarless journal axle; an inner housing for the bearing, adapted to be moved longitudinally over a journal of the axle, for insertion and removal of said bearing upon, and from, the journal, respectively; a load supporting outer housing, adapted to bear on the inner housing; and horizontally spaced coacting elements for detachably securing the inner housing against longitudinal movement, dependably operable upon the load applied by the outer housing.

8. The combination of an anti-friction bearing for a collarless journal axle; an inner housing, adapted to be moved longitudinally over a journal of the axle, for insertion and removal of said bearing upon, and from, the journal respectively; a load supporting outer housing, bearing on the inner housing; and horizontally spaced cooperating members disposed at the upper parts of the housings, for detachably securing the inner housing against longitudinal movement, dependably operable upon the load applied by the outer housing, the two housings having a clearance space between them, at the bottom, whereby the outer housing may be raised, to move one of the cooperating members out of operable position, to permit removal and insertion, of the bearing.

9. The combination of an anti-friction bearing for a collarless journal axle; an inner housing for the bearing, adapted to be moved longitudinally over a journal of the axle, for insertion and removal of said bearing upon and from, the journal respectively; an outer housing for the inner housing, said inner housing having its inner end reduced, and its outer end extending beyond the outer housing; and means for detachably securing the inner housing against longitudinal movement.

10. In a truck support, the combination of an anti-friction bearing for a collarless journal axle; an inner housing for the bearing, adapted to be moved longitudinally over a journal of the axle, for insertion and removal of said bearing, upon and from, the journal, respectively; a truck supporting outer housing bearing on the inner housing; and horizontally spaced cooperating members at the upper parts of the housings, for detachably securing the inner housing against longitudinal movement, dependably operable upon the load applied by the outer housing, the two housings having a clearance space between them, at the bottom, whereby the outer housing may be raised, to remove one of the cooperating members out of operable position, to permit removal and insertion of the bearing; and means on the outer housing whereby it may be secured to the truck.

11. The combination of an anti-friction bearing for a collarless journal axle; an outer housing; an inner housing in the outer housing, of skeleton formation for the bearing, having a reduced continuous inner end, a continuous outer end, extending beyond the outer housing, and upper and lower connecting ribs; and means for detachably securing the inner housing against longitudinal movement.

12. The combination of an outer housing, an inner housing of skeleton formation, for an anti-friction bearing, having a reduced continuous inner end, a continuous outer end, extending beyond the outer housing, and upper and lower connecting ribs, providing open side spaces; and means for detachably securing the inner housing against relative longitudinal displacement, for the purposes as set forth.

13. An inner integral housing of skeleton formation, for an anti-friction bearing, having a reduced continuous inner end; an extended continuous outer end; and upper and lower connecting ribs, providing open side spaces, for the purposes as set forth.

14. The combination of an inner housing for an anti-friction bearing; an outer housing for the inner housing, having its lower portion extended to provide a lower space between the housings, permitting the outer housing to be raised preliminary to removal or insertion of the inner housing; and horizontally spaced coacting elements for detachably securing the inner housing against longitudinal movement disposed between the ends of the two housings, for the purposes as set forth.

15. The combination of an anti-friction bearing for a collarless journal axle; an inner housing for the bearing, having a closed outer end and an open inner end; and an outer load supporting housing, bearing on the inner housing, open at both ends; and means for detachably securing the inner housing against longitudinal movement disposed between the ends of the two housings.

16. The combination of an anti-friction bearing for a collarless journal axle; an inner housing for the bearing, having a closed outer end, including means adapted to engage the end of the axle to take the end thrust thereof; an outer load supporting, housing, bearing on the inner housing; and means disposed between the ends of the two housings for securing the inner housing, to adapt said inner housing to resist the said end thrust.

17. The combination of an anti-friction bearing for a collarless journal axle; an inner housing for the bearing, having a closed outer end; an anti-friction member in said outer end, adapted to engage the end of the axle to take the end thrust thereof; an outer, load supporting housing, bearing on the inner housing; and means disposed between the ends of the two housings for securing the inner housing to adapt said anti-friction member to resist the said end thrust.

18. The combination of an outer housing; an inner housing contained in the outer housing, having an inner shoulder, and an inner end wall provided with an opening for the reception of an axle; a bushing within the inner housing, abutting against said inner shoulder; a closure for the outer end of the inner housing, bearing against said bushing; and roller bearings within this inner housing, confined between the said inner end wall and closure.

19. In a mechanism of the character described, the combination of an outer housing open at its inner end for the insertion of a journal, and at its outer end for the insertion of an inner housing; a journal within the outer housing; an inner housing within the outer housing and receiving the journal; an anti-friction bearing interposed between the inner housing and the journal; and means comprising a tongue on one of the housings interfitted in a socket on the other of the housings for holding the housings against movement longitudinally one of the other, said tongue and socket being adapted to be separated to permit the inner housing to be withdrawn longitudinally from the outer housing by moving the housings one relatively to the other in a vertical direction.

20. In a mechanism of the character described, the combination of an outer housing open at its inner end for the insertion of a journal, and at its outer end for the insertion of an inner housing; a journal within the outer housing; an inner housing within the outer housing and receiving the journal; an anti-friction bearing interposed between the inner housing and the journal, the said inner housing having an opening at its outer end for the insertion of said anti-friction bearing; a detachable closure for the opening at the outer end of the inner housing; and an anti-friction thrust bearing interposed between the outer end of the journal and the detachable closure of the inner housing.

CHARLES W. TODD.